(12) United States Patent
Mann et al.

(10) Patent No.: US 9,253,035 B2
(45) Date of Patent: Feb. 2, 2016

(54) REDUCING SWITCH STATE SIZE IN FLOW-BASED NETWORKS

(71) Applicant: International Business Machines Corporation, Armonk, NY (US)

(72) Inventors: Vijay Mann, New Delhi (IN); Aakash S. Iyer, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 13/772,800

(22) Filed: Feb. 21, 2013

(65) Prior Publication Data

US 2014/0233399 A1    Aug. 21, 2014

(51) Int. Cl.
*H04L 12/751* (2013.01)
*H04L 12/721* (2013.01)
(Continued)

(52) U.S. Cl.
CPC ............ *H04L 41/0806* (2013.01); *H04L 45/64* (2013.01); *H04L 43/026* (2013.01); *H04L 45/38* (2013.01)

(58) Field of Classification Search
CPC ............ H04L 12/1886; H04L 12/4641; H04L 2212/0025; H04L 41/0213; H04L 45/04; H04L 45/16; H04L 45/24; H04L 45/34; H04L 49/201; H04L 49/351; H04L 49/354; H04L 12/18; H04L 12/1877; H04L 12/46; G06F 9/45558; G06F 2009/4557
USPC ............................ 370/254–350; 709/201–213
See application file for complete search history.

(56) References Cited

U.S. PATENT DOCUMENTS 7,936,764 B1    5/2011  Krishnan
8,995,435 B2 *  3/2015  Sayani et al. .................. 370/382
(Continued)

FOREIGN PATENT DOCUMENTS

EP    1887741 A1    2/2008
EP    2355423 A1    8/2011
(Continued)

OTHER PUBLICATIONS

Jiang, High Performance Packet Forwarding on Parallel Architectures. A Dissertation Presented to the Faculty of the USC Graduate School University of Southern California, Dec. 2010.
(Continued)

*Primary Examiner* — Ayaz Sheikh
*Assistant Examiner* — Debebe Asefa
(74) *Attorney, Agent, or Firm* — Ryan, Mason & Lewis, LLP (57) ABSTRACT

Techniques, systems, and articles of manufacture for reducing switch state size in flow-based networks. A method includes installing a first hop rule on a first hop switch in a network for a given flow that originates from the first hop switch, wherein the rule adds tags onto a given packet that matches a description of the given flow, wherein the tags correspond to output ports used for forwarding the given packet on each subsequent switch in the network on the path of the given flow; installing and analyzing forwarding rules at each subsequent switch in the network on the path of the given flow to confirm a match with the given packet at each subsequent switch based only on the outermost tag on the given packet; and removing the outermost tag from the given packet and forwarding said given packet to the output port corresponding to said removed outermost tag.

18 Claims, 5 Drawing Sheets

(51) Int. Cl.
*H04L 12/24* (2006.01)
*H04L 12/715* (2013.01)
*H04L 12/26* (2006.01)

(56) References Cited

U.S. PATENT DOCUMENTS

| | | | | |
|---|---|---|---|---|
| 2005/0163137 | A1* | 7/2005 | Wakumoto et al. | 370/406 |
| 2005/0183137 | A1* | 8/2005 | Jooste | 726/4 |
| 2009/0245109 | A1* | 10/2009 | Hurley et al. | 370/235 |
| 2011/0261722 | A1 | 10/2011 | Awano | |
| 2011/0286324 | A1 | 11/2011 | Bellagamba et al. | |
| 2013/0329731 | A1* | 12/2013 | Gabriel et al. | 370/392 |
| 2014/0233579 | A1* | 8/2014 | Flynn et al. | 370/401 |

FOREIGN PATENT DOCUMENTS

| | | |
|---|---|---|
| EP | 2493128 A1 | 8/2012 |
| WO | 2012082988 A1 | 6/2012 |

OTHER PUBLICATIONS

Bianco et al., Open Flow Switching: Data Plane Performance. May 23-27, 2010.
Cisco Data Center Infrastructure 2.5 Design Guide. Dec. 6, 2007.
Cisco. Chapter 17, Configuring IP Unicast Layer 3 Switching on Supervisor Engine 2. Catalyst 6500 Series Switch Cisco IOS Software Configuration Guide—Release 12.1 E. 2003.
Hoover, Inside Microsoft's $550 Million Mega Data Centers. Information Week. Jun. 17, 2008.
Mininet: Rapid Prototyping for Software Defined Networks, http://yuba.stanford.edu/foswiki/bin/view/OpenFlow/Mininet Dec. 5, 2012.
Multiprotocol Label Switching (MPLS) http://www.cisco.com/en/US/products/ps6557/productsiostechnologyhome.html Jan. 29, 2013.
Open vSwitch—An Open Virtual Switch http://www.openvswitch.org Jan. 29, 2013.
OpenFlow Switch, Feb. 28, 2011, pp. 1-56.
Benson et al., MicroTE: Fine Grained Traffic Engineering for Data Centers. in ACM CoNEXT, 2011.
Braga et al., Lightweight DDoS Flooding Attack Detection Using NOX/OpenFlow, in 35th Annual IEEE Conference on Local Computer Networks, 2010.
Chiba et al., Source Flow: Handling Millions of Flows on Flow-Based Nodes, in ACM SIGCOMM, 2010.
Curtis et al. DevoFlow: Scaling Flow Management for High-Performance Networks, in ACM SIGCOMM, 2011.
Perino et al., A Reality Check for Content Centric Networking, in ACM ICN, 2011.
Al-Fares et al., Hedera: Dynamic Flow Scheduling for Data Center Networks, in USENIX NSDI, 2010.
Gude et al., NOX: Towards an Operating System for Networks, in ACM SIGCOMM Computer Communication Review, 2008.
Arsovski, A Ternary Content-Addressable Memory (TCAM) Based on 4T Static Storage and Including a Current-Race Sensing Scheme, in IEEE Journal of Solid-State Circuits, 2003.
Leiserson, Fat-Trees: Universal Networks for Hardware-Efficient Supercomputing, in IEEE Transactions on Computers, 1985.
Mann et al., VMFlow: Leveraging VM Mobility to Reduce Network Power Costs in Data Centers, in IFIP Networking, 2011.
McKeown et al. OpenFlow: Enabling Innovation in Campus Networks, in ACM SIGCOMM Computer Communication Review, 2008.
Mogul et al., DevoFlow: Cost-Effective Flow Management for High Performance Enterprise Networks, in ACM Hotnets, 2010.
Mysore et al., PortLand: A Scalable Fault-Tolerant Layer 2 Data Center Network Fabric, in ACM SIGCOMM, 2009.
Yu et al., Scalable Flow-Based Networking with DIFANE, in ACM SIGCOMM, 2010.
Rothenberg et al., Data Center Networking with In-Packet Bloom Filters, in Brazilian Symposium on Computer Networks (SBRC), 2010.
Sherwood, An Experimenters Guide to Openflow, GENI Engineering Workshop, 2010.
Kandula et al., The Nature of DataCenter Traffic: Measurement and Analysis, in IMC, 2009.
Benson et al., Network Traffic Characteristics of Data Centers in the Wild, in IMC, 2010.
Wang et al., OpenFlow-Based Server Load Balancing Gone Wild, in Workshop on Hot Topics in Management of Internet, Cloud, and Enterprise Networks and Services (Hot-ICE), 2011.
Zane et al., CoolCAMs: Power-Efficient TCAMs for Forwarding Engines, in IEEE INFOCOM, 2003.

* cited by examiner

REDUCING SWITCH STATE SIZE IN FLOW-BASED NETWORKS

FIELD OF THE INVENTION

Embodiments of the invention generally relate to information technology, and, more particularly, to network management.

BACKGROUND

OpenFlow is a commonly-used network architecture that physically decouples the control plane from the data plane in a network. A logically centralized controller (the control plane) independently controls each flow in the network by installing customized flow-rules for forwarding switches (the data plane). A flow-rule includes a "match" field that matches with a given flow, an "instructions" field that details the actions to be taken on the flow, and counters that maintain flow statistics. Accordingly, OpenFlow, via counters, also enables fine-grained monitoring of traffic from every individual flow. This architecture can provide central visibility into the network, thereby allowing various traffic engineering schemes to be implemented, as well as centralized control, allowing security schemes and networks policies to be more narrowly enforced. However, existing approaches utilizing such architecture present challenges such as, for example, increased switch memory requirements, controller bottleneck, and high first packet latency. Accordingly, a need exists to address such issues and facilitate deployment of OpenFlow at the scale of production data centers.

SUMMARY

In one aspect of the present invention, techniques for reducing switch state size in flow-based networks are provided. An exemplary computer-implemented method can include steps of installing a first hop rule on a first hop switch in a network for a given flow that originates from the first hop switch, wherein the first hop rule adds one or more tags onto a given packet that matches a description of the given flow, and wherein the one or more tags correspond to one or more output ports to be used for forwarding the given packet on each of one or more subsequent switches in the network on the path of the given flow such that all packets to be forwarded to the same output port on each switch have an identical outermost tag for that switch; installing and analyzing one or more forwarding rules at each of the subsequent switches in the network on the path of the given flow to confirm a match with the given packet at each of the subsequent switches based only on the outermost tag on the given packet (ignoring all other match fields or treating all other match fields as wildcards); and removing the outermost tag from the given packet and forwarding said given packet to the output port corresponding to said removed outermost tag.

In another aspect of the invention, an exemplary computer-implemented method can include steps of proactively installing a first hop rule on a first hop switch in a network for a given flow that originates from the first hop switch, wherein the first hop rule adds one or more tags onto a given packet that matches a description of the given flow, and wherein the one or more tags correspond to one or more output ports to be used for forwarding the given packet on each of one or more subsequent switches in the network on the path of the given flow such that all packets to be forwarded to the same output port on each switch have an identical outermost tag for that switch. The method also includes proactively installing one or more forwarding rules at each of the subsequent switches in the network on the path of the given flow, wherein the one or more forwarding rules determine a match of the given packet at each of the subsequent switches based on the outermost tag on the given packet. Additionally, the method includes analyzing one or more forwarding rules at each of the subsequent switches in the network on the path of the given flow to confirm a match with the given packet at each of the subsequent switches based only on the outermost tag on the given packet (ignoring all other match fields or treating all other match fields as wildcards), and removing the outermost tag from the given packet and forwarding said given packet to the output port corresponding to said removed outermost tag.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These aspects, as well as other objects, features and advantages of the present invention, will become apparent from the following detailed description of illustrative embodiments thereof, which is to be read in connection with the accompanying set of drawings.

DETAILED DESCRIPTION

As described herein, an aspect of the present invention includes reducing switch state size in flow-based software defined networks. As noted herein, flow-level granularity in OpenFlow using existing approaches traditionally comes at the cost of placing significant stress on switch state size and controller involvement. At least one embodiment of the invention includes reducing switch state size and controller involvement in OpenFlow networks via a system referred to herein as SwitchReduce. SwitchReduce leverages central visibility of OpenFlow to facilitate cooperation between switches, and also mandates that the number of flow rules be bounded by the cardinality of the action space. Further, in at least one embodiment of the invention, flow counters for every flow may be maintained at only one switch in the network.

Figure 1:
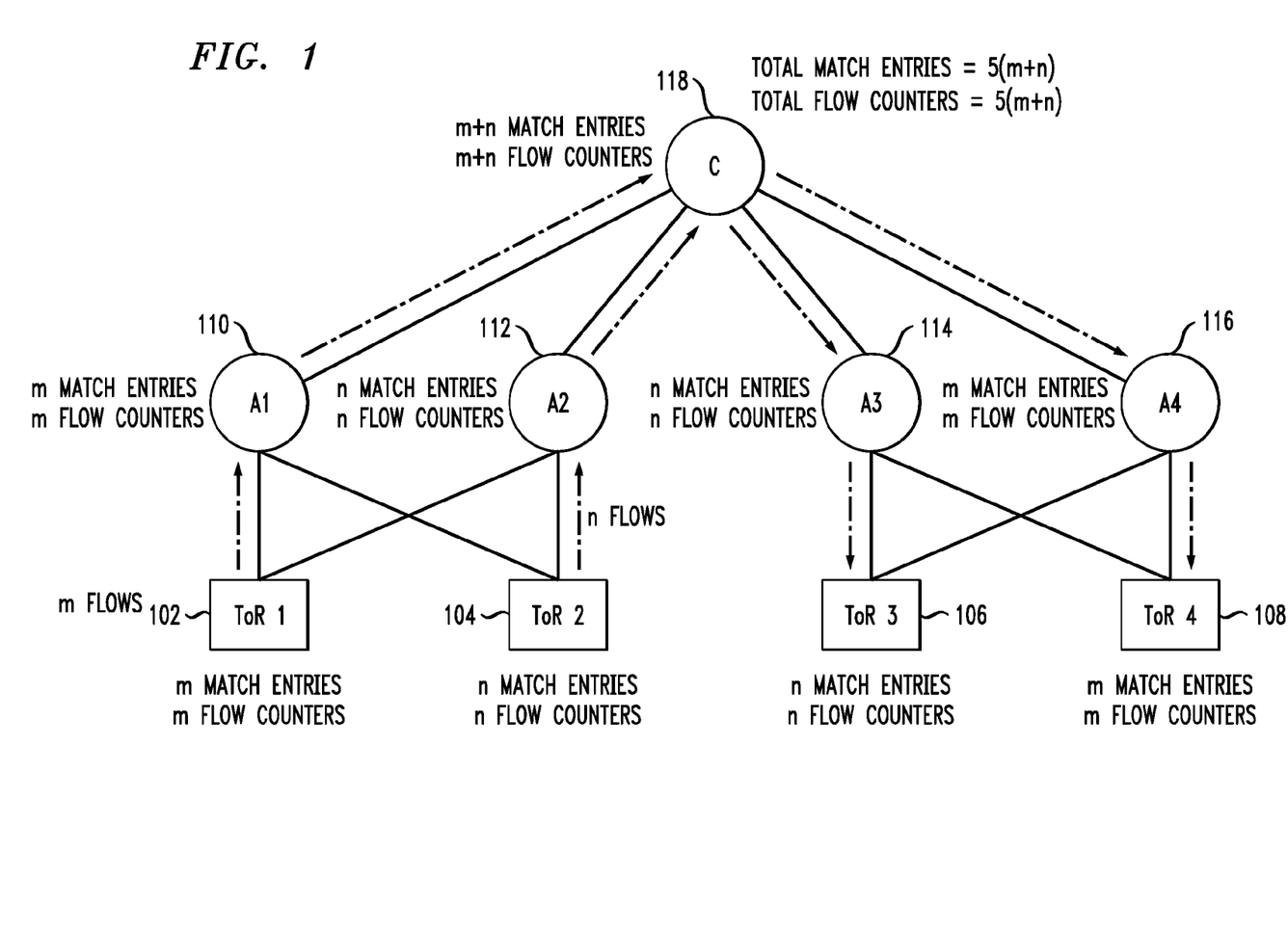
FIG. 1 is a diagram illustrating an example of repetition of match entries and flow counters at every hop in a network.

FIG. 1 is a diagram illustrating an example of repetition of match entries and flow counters at every hop in a network. By way of illustration, FIG. 1 depicts a first top-of-rack (ToR1) switch 102, a second top-of-rack (ToR2) switch 104, third top-of-rack (ToR3) switch 106, and a fourth top-of-rack (ToR4) switch 108. FIG. 1 also depicts a first aggregation switch (A1) 110, a second aggregation switch (A2) 112, a third aggregation switch (A3) 114, a fourth aggregation switch (A4) 116, as well as a core switch (C) 118.

FIG. 1 illustrates how the total number of rules and counters in a network increases linearly with the number of hops. Two sets of flows (indicated as m and n in FIG. 1) traverse from the left-side nodes to the right-side nodes through the core of the network, with each flow requiring five hops. While the total number of flows is only (m+n), flow-level granularity results in a total of 5(m+n) match entries and 5(m+n) flow counters in the network. Failure to compress the switch state will render large scale OpenFlow data centers infeasible.

Enforcing the aforementioned flow-level granularity through a centralized control plane can overburden the controller and create a processing bottleneck at the controller. In a dynamic network where various traffic engineering strategies (such as, for example, re-routing of flows) may need to be deployed, the controller can become overloaded with the task of updating flow entries on every switch belonging to the old and new paths of each re-routed flow. For instance, if the older route for a flow had five hops and the new route has four completely different hops, the controller needs to send nine OpenFlow flow modify/add/delete/etc. messages. This limits the ability of the controller to dynamically alter routes at the scale of a production data center with many (for example, millions) concurrent flows.

Also, packets that do not match a flow rule at a switch are redirected to the controller, resulting in first packet latency of the order of several milliseconds (compared to microseconds for subsequent packets). The dominant component of this latency is the need to transition from the data plane to the control plane over a local area network. Pre-populating flow rules in switches with infinite timeouts (that is, permanent rules) is the means by which existing approaches attempt to reduce latency. However, in such approaches, switch memory (for example, ternary content-addressable memory (TCAM)) becomes a constraint. In this context, at least one embodiment of the invention provides a mechanism (SwitchReduce) for reducing switch state size and controller involvement in OpenFlow networks. SwitchReduce enables pre-population of flow rules in the interior switches (that is, all switches after the first hop switch) of a network, which, as detailed herein, aids in reducing run-time control channel traffic, controller involvement and end-to-end latency.

As also described herein, in at least one embodiment of the invention, the number of match entries at any switch should be no more than the set of unique processing actions the switch has to take on incoming flows. Similarly, according to at least one embodiment of the invention, the flow counters for every unique flow may be maintained at only one switch (for example, the first hop switch) in the network.

An aspect of the present invention includes forwarding network packets based on tags and/or labels added to each packet such that all packets that have to be forwarded to the same output port on each switch are tagged with an identical tag and/or label for that particular switch. This is in contrast to the existing routing/forwarding schemes that forwards packets based on destination addresses. This is also in contrast to other label-based techniques which rely on a label distribution protocol to disseminate updated label information to all participating switches. The techniques detailed herein include reducing the number of forwarding/routing entries per network switch because the techniques limit the number of entries at a switch to the number of output ports on that switch. Additionally, the number of entries does not change with an increasing number of hosts or subnets. Further, the techniques detailed herein achieve this centrally without the need for any overhead mechanism to distribute label information.

One or more embodiments of the invention include the use of a combination of wildcard rules and rules that add a specific group of tags or labels to each packet. Additionally, as further described herein, at least one embodiment of the invention includes enabling per-flow monitoring (at the first hop), as well as quick rerouting of flows because the OpenFlow controller need only change the RouteHeader (the group of labels/tags on the first hop), while the rest of the rules in the network may be pre-populated.

Figure 2:
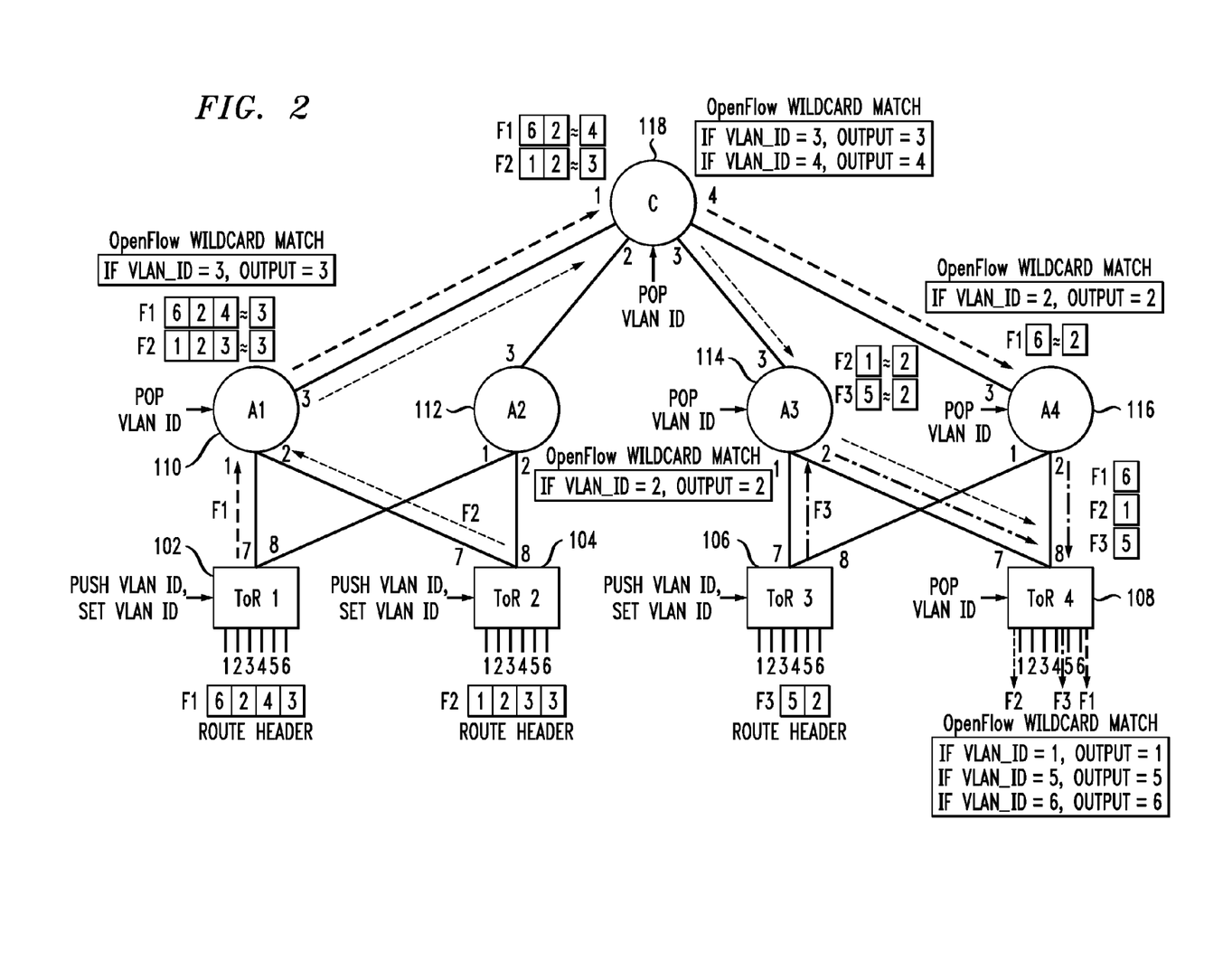
FIG. 2 is a diagram illustrating an example embodiment, according to an aspect of the invention.

FIG. 2 is a diagram illustrating an example embodiment, according to an aspect of the invention. Similar to the network illustrated in FIG. 1, FIG. 2 depicts ToR1 switch 102, ToR2 switch 104, ToR3 switch 106, and ToR4 switch 108. FIG. 2 also depicts Aggregation A1 switch 110, Aggregation A2 switch 112, Aggregation A3 switch 114, Aggregation A4 switch 116, and Core C switch 118. As illustrated, FIG. 2 depicts a hop-by-hop view of some packets in transit from their respective sources to destinations. FIG. 2 demonstrates how SwitchReduce is able to route each packet without having a dedicated rule for the packet at any hop except for the first hop.

As depicted in FIG. 2 and additionally described herein, at least one embodiment of the invention includes the use of wildcard identical action flows. One concept behind an OpenFlow rule is the ability to apply a customized action on every flow. Therefore, the number of flow rules can be bounded by the cardinality of the action space.

It should be noted that, for ease of explanation, the following description is limited to forwarding rules, although the principles described herein can be extended to more diverse flow rules. Accordingly, for a forwarding flow rule, the action field can be thought of as forwarding a packet that matches the flow rule to an output port.

An example scenario can include several thousands of flows passing through a switch. Also, the number of ports on many commercial switches is less than 128. In fact, many ToR switches typically have less than or equal to 64 ports, while aggregation and core switches have even fewer ports (albeit with much higher bandwidth). In some diverse topologies, the switches used can have 52 ports for ToRs and 96 ports for Aggregation and Core. Effectively, while there can be several thousand flows through a switch, there are only a handful of ports that the flows can use. In other words, there are only a handful of actions that all flows must share.

If one entry is installed for every unique flow in a switch, the result would be several thousand exact-match flow rule entries. In data centers that house several hundreds of thousands of servers, each server possibly running several virtual machines (VMs), this would require millions of exact-match flow rule entries. This is not achievable with existing hardware. If, on the other hand, one entry was installed for every unique action, the result would be only a handful of wildcard flow rule entries (that typically go into a TCAM).

Accordingly, in at least one embodiment of the invention, all flows in a switch having identical actions associated with them, with the exception of flows at the first hop switch, can be compressed into one wildcard flow rule. Within the specific context of forwarding rules, all flows in a switch having the same output port, with the exception of flows at the first hop switch, can be compressed into one wildcard flow rule.

The first hop switch can be an OpenFlow enabled virtual switch (vswitch). This vswitch runs inside a hypervisor and connects all of the VMs running inside the hypervisor to the network. In the absence of a virtual switch, the ToR switch will serve as the first hop. At switches that are not first-hop switches, all flows with the same action are compressed into one wildcard flow entry. At the first hop, flows originating from directly-connected VMs are not wildcarded, but all other flows are compressed into a wildcard flow entry.

Flows at their first hop are not compressed into a wildcard flow entry because at least one embodiment of the invention requires one exact-match entry, a unique identity, for every flow at its first hop to both carry out the above-mentioned wildcarding as well as to maintain flow level control and statistics. Also, in at least one embodiment of the invention, the number of flow rules is bounded by the cardinality of the action space, and each wildcard flow rule maps all intended matching flows to the correct action.

Also, as described herein and additionally depicted in FIG. 2, at least one embodiment of the invention includes the use of RouteHeaders. To construct a wildcard rule, some commonality (in terms of an OpenFlow header field) should exist that is both exhaustive and exclusive to the flows being wildcarded. The wildcard can be created on this common field. However, there is a chance that such commonality may not exist between flows that share the same output port (at a switch) and therefore need to be wildcarded. In such an instance, at least one embodiment of the invention includes creating a wildcard when there is no inherent commonality between the flows being wildcarded.

To achieve wildcarding, underlying properties of OpenFlow can be exploited. Such properties can include, for example, a centralized visibility that makes the controller aware of the entire path from source to destination, and a centralized routing that gives the controller freedom to choose any routing technique. The controller leverages these attributes to facilitate cooperation between switches such that each switch informs the next switch of the appropriate output port to use when forwarding a packet. In at least one embodiment of the invention, an algorithm is utilized that divides a packet's path into three zones: the first hop, the intermediate hops, and the last hop. In the example depicted in FIG. 2, a three-layer topology is considered wherein it is assumed that ToR switches form the lowermost layer. In a virtual environment, the ToR layer will be replaced by a vswitch layer, and an aggregation layer will be replaced by a ToR layer.

In connection with the zone of the first hop, when a new flow originates at its first hop, the controller installs in it an exact match rule with a set of actions. Such an action set can include, for example, forwarding packets belonging to this flow on this designated port (Port 7 for Flow F1 in the example in FIG. 2). Additionally, at least one embodiment of the invention comprises the action set including the addition of one or more tags or labels (for example, using Push virtual local area network (VLAN) identifier (ID), Set VLAN ID to add a certain number of VLAN headers or other actions to add a certain number of MPLS headers), collectively referred to herein as RouteHeaders, onto packets belonging to this flow.

The number of added VLAN headers or other tags (such as MPLS headers) is equal to the number of remaining hops on the packet's path from the first hop to the destination. In FIG. 2, the RouteHeader for Flow F1 is the four-element array corresponding to four newly-added VLAN headers, one for each hop after ToR1. The RouteHeader can be considered a concatenation of the appropriate number of 12-bit VLAN headers, each uniquely identifying the action that is to be taken at every subsequent hop along the packet's path. Further, by specifically considering forwarding rules, each VLAN ID in the RouteHeader uniquely identifies the output port for the packet at every subsequent hop along its path. For simplicity, the example depicted in FIG. 2 chooses the value of the VLAN ID to be the same as the value of the output port on the corresponding hop. Accordingly, if the output port for a packet at a switch is X, the VLAN ID in the packet's RouteHeader for this hop will also have value X. In practice, this need not necessarily be the case so long as there is a one-to-one mapping between the space of VLAN IDs and the space of actions. In other words, the VLAN ID can contain a unique action ID, and 12-bits can accommodate up to 4096 unique actions.

The RouteHeader carries the entire route that a flow will take based on a routing decision taken by the central controller. The outermost VLAN ID (right-most in FIG. 2) contains the action ID (the output port in the FIG. 2 example) for the action taken by the second hop, the next VLAN ID contains the action ID for the next hop, and so on.

With forwarding actions considered in this example, at least one embodiment of the invention includes using the output port itself as the action ID. The outermost VLAN ID from the RouteHeader (shown as the rightmost 12-bit value '3' for Flow F1 in FIG. 2) contains the output port for the second hop (Port 3 on Switch A1—the first hop after ToR1), the next VLAN ID '4' contains the output port for the third hop (Port 4 on Switch C), and so on.

In connection with the zone of the intermediate hops, when the controller installs an exact match rule for a flow in the first hop, the controller also installs a wildcard rule in the intermediate hops. In the match field of this wildcard rule, all fields except for the VLAN ID are set to "Don't Care" or "Ignore," while the VLAN ID is set to the action ID (output port) for the flow. The corresponding action field contains the output port for the flow.

The wildcard rule can be installed simultaneously while installing the first hop rule, or can be installed proactively. Because there are a limited number of wildcard rules in SwitchReduce which are known in advance, it is possible to pre-populate the interior switches (all subsequent switches after the first hop switch) with these rules. In a virtual environment (where the first hop is a vswitch), SwitchReduce enables proactive pre-population of all physical switches in the data center network with OpenFlow rules. SwitchReduce, therefore, presents techniques for pre-populating OpenFlow rules in switches.

Additionally, in at least one embodiment of the invention, it is the outermost VLAN header of a packet that will be used by the switches to perform a VLAN-based match. Accordingly, when the packet arrives at the switch, the packet automatically matches the wildcard entry corresponding to the outermost VLAN ID of its RouteHeader. The flow rule installed by the switch in the intermediate hop then sets the output port for the packet to the specified value when the VLAN header contains the given value (for example, setting the output port to three when VLAN ID is three for flow F1 at Switch C in FIG. 2). Additionally, the pop VLAN ID is used to pop the outermost VLAN ID.

Accordingly, at least one embodiment of the invention includes selecting an output port based on the outermost VLAN header. Also, the outermost VLAN header is removed from the RouteHeader before forwarding the packet to the output port. The new outermost VLAN header now corresponds to the action ID for the next hop. Thus, in addition to forwarding the packet, each switch also prepares the packet for a match with the correct wildcard rule on the next switch. Such cooperation between switches enables the wildcarding mechanism described herein. Further, packets that need to be forwarded to a particular output port enter a switch with their outermost VLAN ID that is pre-set (by the previous hop) to match the correct wildcard entry.

In connection with the zone of the last hop, the last-hop also contains a wildcard rule for the given flow. The corresponding actions include setting the output port for the packet to the specified value when the VLAN header contains the given value (for example, setting the output port to six when VLAN ID is six for flow F1 at ToR4 in FIG. 2), as well as using the pop VLAN ID to pop the outermost VLAN ID. In this particular context, where forwarding is the only action being performed by the switches, the last hop is identical to the intermediate hops. In fact, even these last hop rules can be pre-populated in a forwarding-only scenario.

Accordingly, RouteHeaders facilitate realizing the wildcarding techniques detailed above. Consider, for example, flows F2 and F3 of FIG. 2. F2 and F3 are between two separate source-destination pairs and have very diverse paths in the network. However, their paths cross at one link in the network, namely the link joining A3 to ToR4. Thus, A3 performs the same action on both F2 and F3. Accordingly, at least one embodiment of the invention includes installing a wildcard rule in A3 such that both F2 and F3 match that wildcard. To do so, a rule is created that says "If the VLAN ID is 2, output to port 2."

Accordingly, ToR2 installs the RouteHeader in packets belonging to flow F2. Also, switch A1 pops the outermost VLAN ID to send to switch C, and switch C pops the outermost VLAN ID again to send to switch A3. Thus, when packets from flow F2 reach A3, the outermost VLAN ID is already set to '2,' and a match with the aforementioned wildcard rule occurs. Similarly, ToR3 installs the RouteHeader in packets belonging to flow F3. Because A3 is the first hop (after ToR3) for flow F3, the outermost VLAN ID is already set to '2.' Accordingly, a match with the wildcard rule occurs. In this manner, both F2 and F3 match the same wildcard at switch A3.

In another embodiment of the invention, the RouteHeader can be a single 60-bit header (instead of a group of tags or labels). The RouteHeader can be a concatenation of ten six-bit values sequentially representing the output port at every subsequent hop along the flow's path. Additionally, the lower six bits contain the output port for the second hop (for example, Port 3 on Switch A1 in FIG. 2 for flow F1), the next six bits contain the output port for the third hop (for example, Port 4 on Switch C in FIG. 2 for flow F1), and so on. Ten values can accommodate ten hops, and this is sufficient for nearly all data center scenarios because the maximum number of hops in data centers is typically less than seven. Six bits represent 64 ports, and this is also sufficient for most commercial switches. If, however, 128 port switches need to be accommodated, the RouteHeader must be increased to 70-bits and each hop must be assigned seven-bits.

As part of an algorithm utilized in this embodiment of the invention, all switches perform a small additional operation on every data path packet before forwarding the data path packet out. By way of illustration, the operation can include the following:

1. Copy the lower six bits of the RouteHeader onto the lower six bits of the packet's VLAN ID.
2. Right shift the RouteHeader by six bits.

This operation ensures that when the packet leaves this hop, the VLAN ID of the packet is already updated to the output port on the next hop, and the packet's RouteHeader is updated to hold output ports for all hops thereafter. This operation can be referred to as "Shift-And-Copy." Further, this operation can be implemented via software (a control plane) and/or hardware (a data plane) using the Arithmetic Logic Unit of the switch's on-board processor. Also, for example, such bitwise operations on headers added using the OpenFlow Push-Tag primitive can be supported as valid OpenFlow actions.

Additionally, an aspect of the invention includes division of labor. As detailed above, at least one embodiment of the invention includes ensuring that flow-level routing decisions can be taken by the controller even though there are not as many flow-specific entries. To ensure that the sanctity of flow-level granularity is not disturbed, at least one embodiment of the invention includes ensuring that the controller is able to gather flow-level statistics.

This can be achieved, in at least one embodiment of the invention, automatically by design. Such an embodiment can include choosing not to wildcard flows at the first hop. This indicates that there is an exact-match rule, a unique identity, for every flow at its first hop; that is, the switch where this flow first appears in the network. The controller can gather flow statistics from these first hop (vswitch or ToR) switches. The rest of the switches can collect port-level statistics (which can be used to detect congestion in the network), and need not be involved in collection of flow-level statistics. For a reliable delivery protocol such as, for example, transmission control protocol (TCP), the end-to-end throughput is a constant, therefore flow statistics would yield the same information regardless of the hop from which they are polled.

By way of example, assume the link from core switch C (Port 3) to Aggregation switch A3 in FIG. 2 is congested. The controller can examine port statistics for port 3 to detect congestion. Subsequently, the controller can examine all flows in the network that are being sent to that port. The controller has access to this information because the controller installed RouteHeaders for each flow, and the controller can additionally maintain a list of all flows that use any given port on any given switch. Accordingly, the controller can examine respective first-hops to determine how much traffic is being contributed by each flow.

Additionally, by way merely of example, one or more embodiments of the invention can include implementing SwitchReduce as a controller application. Given any network, the application learns its entire topology, which includes the location of all switches in the network and the interconnections thereof, as well as a mapping of hosts to ToR switches. The host to ToR mapping is obtained by tracking the first OFPT_PACKET_IN event at the controller from every ToR switch. This event also triggers a pro-active route computation algorithm within the controller which pre-computes the shortest available route between every possible pair of hosts. This can be carried out to minimize controller processing time once actual traffic begins.

In an example embodiment, the controller also pre-populates all interior switches (all subsequent switches after the first hop switch) in the network as well as the last hops with all possible wildcard rules upon completion of the pro-active route computation algorithm. Accordingly, before traffic in the network begins, all switches except for the first hop switches have wildcard rules installed therein. These wildcard rules have all bits except for VLAN ID set to 'x,' and the VLAN ID is set to one of the output port numbers. Thus, the number of wildcard rules is equal to the number of output ports on each switch. The corresponding actions installed by the controller for these rules are OFPAT_POP_VLAN, which pops the outermost header after a match, and OFPAT_OUTPUT, which forwards the flow to its designated output ports.

At the destination ToR, the last added VLAN header is removed and the flow is delivered to its destination.

When a new flow arrives at the first hop switch, an OFPT_PACKET_IN action is sent to the controller. Additionally, the controller looks-up the pre-computed route for this flow and installs an exact match rule in the ToR with corresponding actions OFPAT_PUSH_VLAN and OFPAT_SET_VLAN_VID to push and set the requisite number of VLAN headers onto the flow. Further, the controller also installs an OFPAT_OUTPUT action which forwards the packet out from the designated port.

Figure 3:
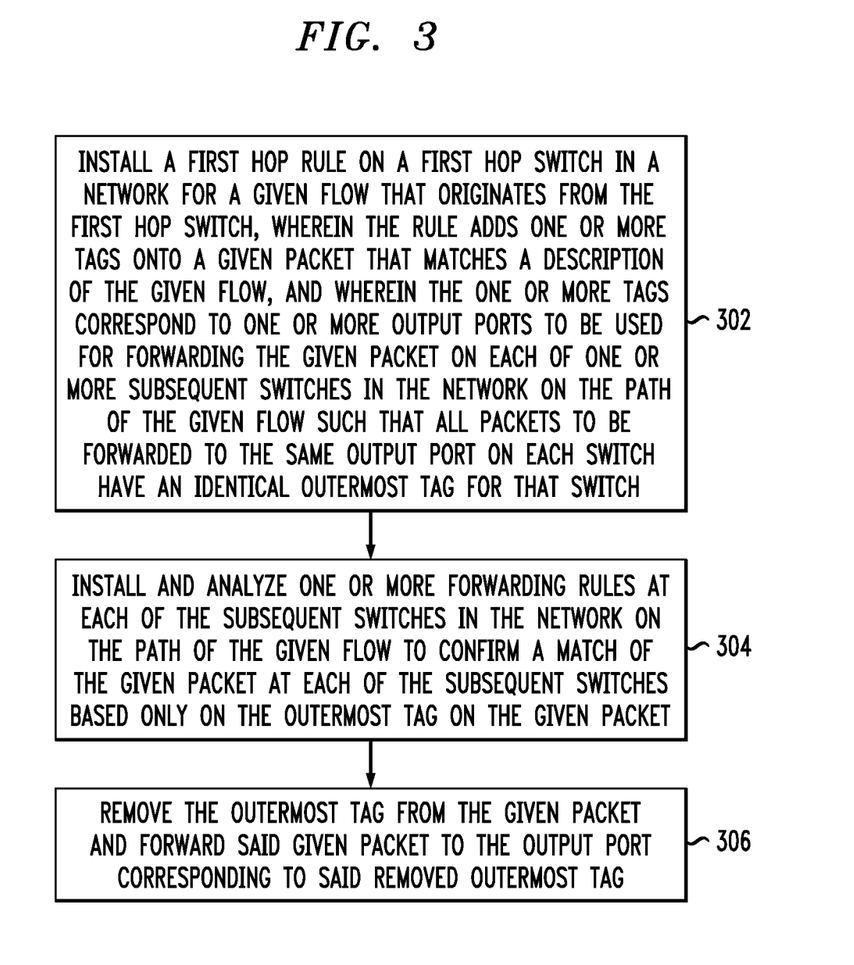
FIG. 3 is a flow diagram illustrating techniques according to an embodiment of the invention.

FIG. 3 is a flow diagram illustrating techniques according to an embodiment of the present invention. Step 302 includes installing a first hop rule on a first hop switch in a network for a given flow that originates from the first hop switch, wherein the first hop rule adds one or more tags (referred to herein as RouteHeaders) onto a given packet that matches a description of the given flow, and wherein the one or more tags correspond to one or more output ports to be used for forwarding the given packet on each of one or more subsequent switches in the network on the path of the given flow such that all packets to be forwarded to the same output port on each switch have an identical outermost tag for that switch. As detailed herein, the first hop switch can include a virtual software switch that resides inside a hypervisor and/or a host operating system.

Step 304 includes installing and analyzing one or more forwarding rules at each of the subsequent switches in the network on the path of the given flow to confirm a match with the given packet at each of the subsequent switches based only on the outermost tag on the given packet (ignoring all other match fields or treating all other match fields as wildcards). Analyzing can include confirming a match of the given packet at each of the subsequent switches based on the outermost tag on the given packet. The forwarding rules can include a rule for confirming that all packets on a given switch that are to be forwarded to the same output port are tagged with an identical outermost tag for the given switch. Additionally, at least one embodiment of the invention includes compressing the one or more forwarding rules for all flows at a given switch having the same output port into one wildcard flow rule, with the exception of flows at the first hop switch.

Additionally, as used herein, the outermost tag includes either the outermost VLAN header or outermost multiprotocol label switching (MPLS) tag. Further, there is more than one tag being pushed onto each packet. It is the outermost tag (which keeps changing as the packet moves along) that each switch is analyzing. Also, at least one embodiment of the invention includes installing one or more forwarding rules on all switches except for the first hop switch, and wherein each of said one or more forwarding rules has a match which includes all fields as wildcards except for the VLAN or MPLS field which is set to be equal to the value of the outermost VLAN or MPLS header value expected for each output port on the switch.

Step 306 includes removing the outermost tag from the given packet and forwarding said given packet to the output port corresponding to the removed outermost tag. Forwarding can include forwarding the given packet to the output port identified by the value of the removed outermost tag. The value can include, for example, an integer that maps to a unique action. Additionally, the techniques depicted in FIG. 3 can also include removing the tag from the given packet upon confirming the network flow match of the given packet at each of the subsequent switches.

As described herein, the first hop rule uniquely identifies a flow in the network. Additionally, at least one embodiment of the invention includes maintaining one or more counters at the first hop switch to be polled by a network controller, thereby enabling monitoring of each new flow that originates from the first hop switch. Further, the techniques depicted in FIG. 3 can include rerouting the given flow by installing a new first hop rule that adds a new group of one or more tags on each matching packet. In at least one embodiment of the invention, the controller makes routing decisions for each flow as well as assigning meaning to different values that a tag can have. Therefore, once the controller has decided a route for a flow or that it wants to reroute the flow, the controller automatically knows what tags to push onto packets belonging to the flow.

Figure 4:
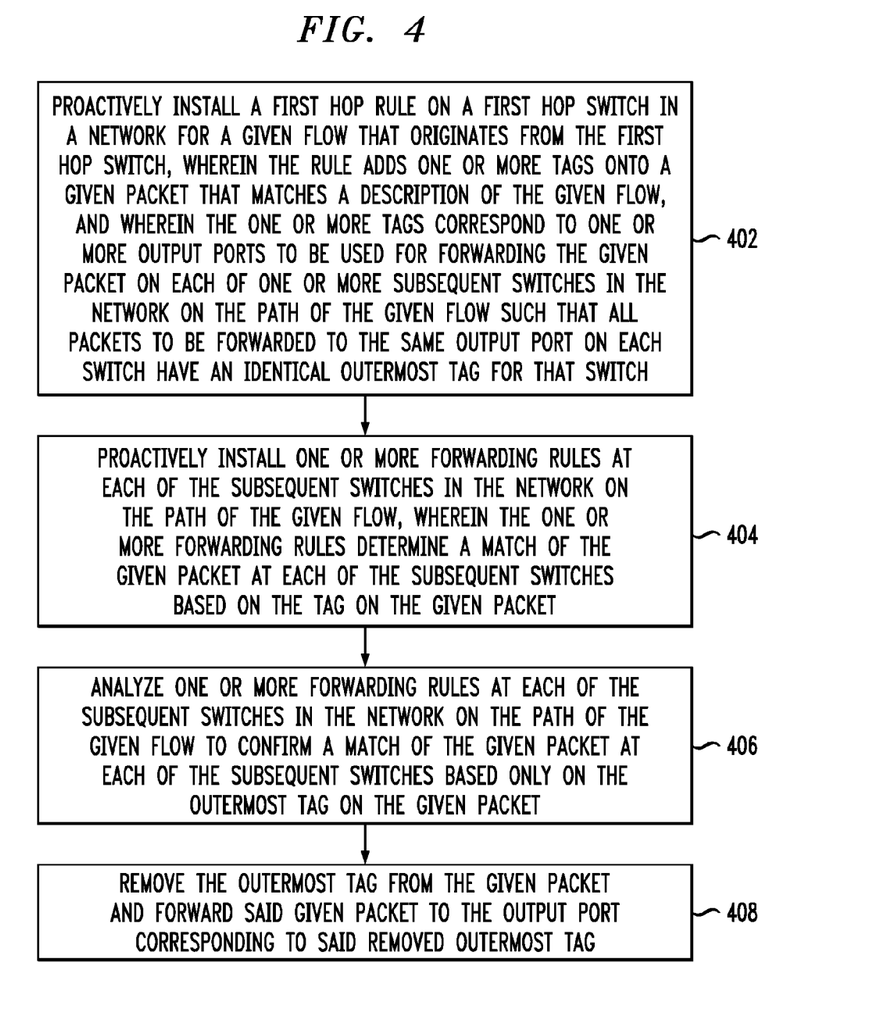
FIG. 4 is a flow diagram illustrating techniques according to an embodiment of the invention.

FIG. 4 is a flow diagram illustrating techniques according to an embodiment of the invention. Step 402 includes proactively installing a first hop rule on a first hop switch in a network for a given flow that originates from the first hop switch, wherein the first hop rule adds one or more tags onto a given packet that matches a description of the given flow, and wherein the one or more tags correspond to one or more output ports to be used for forwarding the given packet on each of one or more subsequent switches in the network on the path of the given flow such that all packets to be forwarded to the same output port on each switch have an identical outermost tag for that switch.

Step 404 includes proactively installing one or more forwarding rules at each of the subsequent switches in the network on the path of the given flow, wherein the one or more forwarding rules determine a match of the given packet at each of the subsequent switches based on the outermost tag on the given packet. Step 406 includes analyzing one or more forwarding rules at each of the subsequent switches in the network on the path of the given flow to confirm a match with the given packet at each of the subsequent switches based only on the outermost tag on the given packet (ignoring all other match fields or treating all other match fields as wildcards). Step 408 includes removing the outermost tag from the given packet and forwarding said given packet to the output port corresponding to said removed outermost tag.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
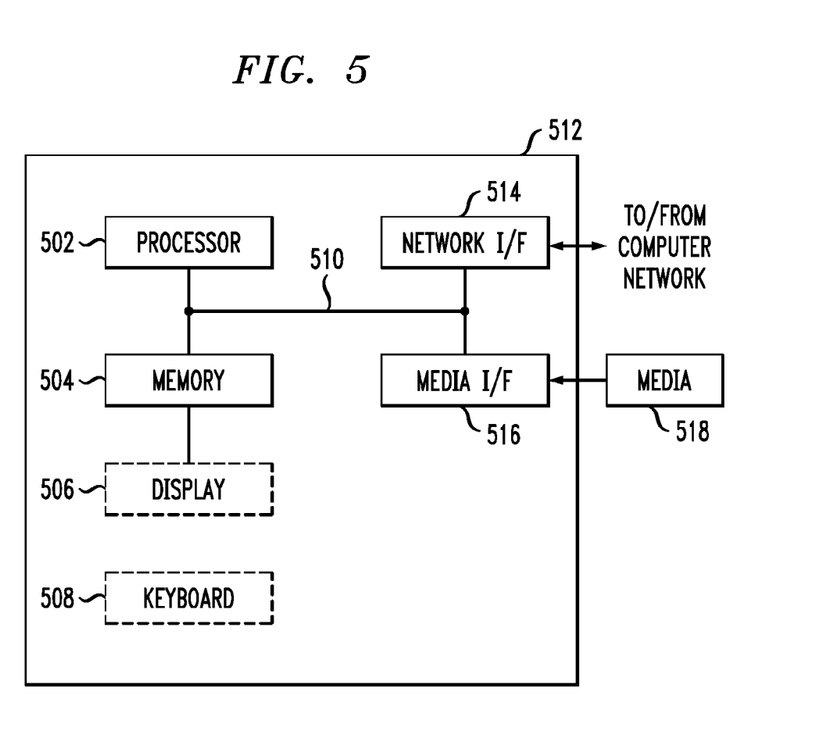
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, pre-populating forwarding rules in higher layers of a network so as to reduce controller load in direct proportion to the number of hops.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising: installing a first hop rule on a first hop switch in a network for a given flow that originates from the first hop switch, wherein the first hop rule adds one or more tags onto a given packet that matches a description of the given flow, wherein the first hop switch is a virtual software switch that resides inside a hypervisor, and wherein the one or more tags correspond to one or more output ports to be used for forwarding the given packet on each of one or more subsequent switches in the network on the path of the given flow such that all packets to be forwarded to the same output port on each switch have an identical outermost tag for that switch;

installing and analyzing one or more forwarding rules at each of the subsequent switches in the network on the path of the given flow to confirm a match with the given packet at each of the subsequent switches based only on the outermost tag on the given packet; and removing the outermost tag from the given packet and forwarding said given packet to the output port corresponding to said removed outermost tag; wherein at least one of the steps is carried out by a computer device.

2. The method of claim 1, wherein said installing one or more forwarding rules comprises installing one or more forwarding rules on all switches except for the first hop switch, and wherein each of said one or more forwarding rules has a match which includes all fields as wildcards except for a known header field in the packet which is matched against the value of the outermost tag.

3. The method of claim 1, wherein said forwarding comprises forwarding the given packet to the output port identified by the value of the removed outermost tag.

4. The method of claim 1, wherein the first hop rule uniquely identifies a flow in the network.

5. The method of claim 1, comprising: maintaining one or more counters at the first hop switch to be polled by a network controller, thereby enabling monitoring of each new flow that originates from the first hop switch.

6. The method of claim 1, comprising: rerouting the given flow by installing a new first hop rule that adds a new group of one or more tags on each matching packet.

7. The method of claim 1, wherein the one or more forwarding rules comprise a rule for confirming that all packets on a given switch that are to be forwarded to the same output port are tagged with an identical outermost tag for the given switch.

8. The method of claim 1, comprising compressing the one or more forwarding rules for all flows at a given switch having the same output port into one wildcard flow rule, with the exception of flows at the first hop switch.

9. An article of manufacture comprising a non-transitory computer readable storage medium having computer readable instructions tangibly embodied thereon which, when implemented, cause a computer to carry out a plurality of method steps comprising: installing a first hop rule on a first hop switch in a network for a given flow that originates from the first hop switch, wherein the first hop rule adds one or more tags onto a given packet that matches a description of the given flow, wherein the first hop switch is a virtual software switch that resides inside a hypervisor, and wherein the one or more tags correspond to one or more output ports to be used for forwarding the given packet on each of one or more subsequent switches in the network on the path of the given flow such that all packets to be forwarded to the same output port on each switch have an identical outermost tag for that switch; installing and analyzing one or more forwarding rules at each of the subsequent switches in the network on the path of the given flow to confirm a match with the given packet at each of the subsequent switches based only on the outermost tag on the given packet; and removing the outermost tag from the given packet and forwarding said given packet to the output port corresponding to said removed outermost tag.

10. The article of manufacture of claim 9, wherein said installing one or more forwarding rules comprises installing one or more forwarding rules on all switches except for the first hop switch, and wherein each of said one or more forwarding rules has a match which includes all fields as wildcards except for a known header field in the packet which is matched against the value of the outermost tag.

11. The article of manufacture of claim 9, wherein said forwarding comprises forwarding the given packet to the output port identified by the value of the removed outermost tag.

12. The article of manufacture of claim 9, wherein the first hop rule uniquely identifies a flow in the network.

13. The article of manufacture of claim 9, wherein the method steps comprise: maintaining one or more counters at the first hop switch to be polled by a network controller, thereby enabling monitoring of each new flow that originates from the first hop switch.

14. The article of manufacture of claim 9, wherein the method steps comprise: rerouting the given flow by installing a new first hop rule that adds a new group of one or more tags on each matching packet.

15. The article of manufacture of claim 9, wherein the one or more forwarding rules comprise confirming that all packets on a given switch that are to be forwarded to the same output port are tagged with an identical outermost tag for the given switch.

16. The article of manufacture of claim 9, wherein the method steps comprise: compressing the one or more forwarding rules for all flows at a given switch having the same output port into one wildcard flow rule, with the exception of flows at the first hop switch.

17. A system comprising: at least one distinct software module, each distinct software module being embodied on a non-transitory tangible computer-readable medium; a memory; and at least one processor coupled to the memory and operative for: installing a first hop rule on a first hop switch in a network for a given flow that originates from the first hop switch, wherein the first hop rule adds one or more tags onto a given packet that matches a description of the given flow, wherein the first hop switch is a virtual software switch that resides inside a hypervisor, and wherein the one or more tags correspond to one or more output ports to be used for forwarding the given packet on each of one or more subsequent switches in the network on the path of the given flow such that all packets to be forwarded to the same output port on each switch have an identical outermost tag for that switch; installing and analyzing one or more forwarding rules at each of the subsequent switches in the network on the path of the given flow to confirm a match with the given packet at each of the subsequent switches based only on the outermost tag on the given packet; and removing the outermost tag from the given packet and forwarding said given packet to the output port corresponding to said removed outermost tag.

18. A method comprising: proactively installing a first hop rule on a first hop switch in a network for a given flow that originates from the first hop switch, wherein the first hop rule adds one or more tags onto a given packet that matches a description of the given flow, wherein the first hop switch is a virtual software switch that resides inside a hypervisor, and wherein the one or more tags correspond to one or more output ports to be used for forwarding the given packet on each of one or more subsequent switches in the network on the path of the given flow such that all packets to be forwarded to the same output port on each switch have an identical outermost tag for that switch; proactively installing one or more forwarding rules at each of the subsequent switches in the network on the path of the given flow, wherein the one or more forwarding rules determine a match of the given packet at each of the subsequent switches based on the outermost tag on the given packet; analyzing one or more forwarding rules at each of the subsequent switches in the network on the path of the given flow to confirm a match with the given packet at each of the subsequent switches based only on the outermost tag on the given packet; and removing the outermost tag from the given packet and forwarding said given packet to the output port corresponding to said removed outermost tag; wherein at least one of the steps is carried out by a computer device.

* * * * *